United States Patent [19]

Ranganath et al.

[11] Patent Number: 5,689,441
[45] Date of Patent: Nov. 18, 1997

[54] SIGNAL PROCESSING TECHNIQUES BASED UPON OPTICAL DEVICES

[75] Inventors: Minakanagurki V. Ranganath, Lincroft; John Frank Ribera, Howell, both of N.J.

[73] Assignee: Lucent Technologies Inc., Murray Hill, N.J.

[21] Appl. No.: 409,235

[22] Filed: Mar. 24, 1995

[51] Int. Cl.[6] ................................. G02B 00/00
[52] U.S. Cl. ................. 364/525; 348/571; 348/405; 348/417; 348/418; 358/482; 358/483; 358/471; 359/246
[58] Field of Search ................. 364/726, 525; 348/405–420, 571; 358/470–484

[56] References Cited

U.S. PATENT DOCUMENTS

| | | | |
|---|---|---|---|
| 4,236,043 | 11/1980 | Bromley | 179/1.5 H |
| 4,581,715 | 4/1986 | Hyatt | 364/726 |
| 4,630,120 | 12/1986 | Childs | 358/214 |
| 4,637,055 | 1/1987 | Taylor | 382/31 |
| 4,842,370 | 6/1989 | Brenner et al. | 350/321 |
| 4,931,959 | 6/1990 | Brenner et al. | 364/525 |
| 5,043,808 | 8/1991 | Knauer et al. | 358/133 |
| 5,155,779 | 10/1992 | Avramopoulos et al. | 385/24 |
| 5,289,000 | 2/1994 | Toyofuku | 250/234 |
| 5,309,267 | 5/1994 | Huang | 359/139 |
| 5,321,725 | 6/1994 | Paik et al. | 375/39 |
| 5,408,351 | 4/1995 | Huang | 359/186 |
| 5,424,779 | 6/1995 | Odaka et al. | 348/416 |
| 5,461,679 | 10/1995 | Normile et al. | |

FOREIGN PATENT DOCUMENTS

| | | | |
|---|---|---|---|
| WO-A-86/05607 | 9/1986 | WIPO | G06G 9/00 |

Primary Examiner—James P. Trammell
Assistant Examiner—Demetra R. Smith
Attorney, Agent, or Firm—Steven R. Bartholomew

[57] ABSTRACT

A signal processing system processes an input signal in real time. The system includes a light valve array for selectively attenuating light incident thereupon in response to electronic control signals, a light source for providing illumination, a light-sensitive array for producing electronic output signals representing a processed version of the input signal in response to light incident thereupon, and control circuitry for generating and applying electronic control signals to the light valve array in response to the input signal. The electronic control signals are generated from the input signal and are adapted for implementing an arbitrarily-selected signal processing operation. The light valve array is situated between the light source and the light-sensitive array, such that the light source is selectively attenuated by the light valve array, and such that the selectively attenuated light is incident upon the light-sensitive array.

21 Claims, 4 Drawing Sheets

SIGNAL PROCESSING TECHNIQUES BASED UPON OPTICAL DEVICES

BACKGROUND OF THE INVENTION

The invention relates to optical devices for signal processing.

DESCRIPTION OF PRIOR ART

In the past, linear signal processing operations have been performed by analog systems which utilize various configurations of active light sources, such as light emitting diodes (LEDs), in combination with area-array, charge-coupled devices (CCDs). These systems have also been used to implement electro-optical processors capable of performing complex mathematical operations. Such operations are often performed for the purpose of compressing and/or expanding data signals representing voice and video information, while maintaining the temporal relationship of the data signals. However, analog systems place inherent limitations on the maximum amount of data resolution that may be achieved. Furthermore, digital systems provide data manipulation capabilities that are unavailable or impractical to implement in the relatively harsh operational environment of the analog domain. The digital system provides more stable and predictable data manipulation. What is needed is a digital optical signal processing system which offers enhanced levels of resolution and flexibility relative to existing analog systems.

SUMMARY OF THE INVENTION

A signal processing system processes an input signal in real time. The system includes a light valve array for selectively attenuating light incident thereupon in response to electronic control signals, a light source for providing illumination, a light-sensitive array for producing electronic output signals representing a processed version of the input signal in response to light incident thereupon, and control circuitry for generating and applying electronic control signals to the light valve array in response to the input signal. The electronic control signals are generated from the input signal and are adapted for implementing an arbitrarily-selected signal processing operation. The light valve array is situated between the light source and the light-sensitive array, such that the light source is selectively attenuated by the light valve array, and such that the selectively attenuated light is incident upon the light-sensitive array.

DETAILED DESCRIPTION OF THE PREFERRED EMBODIMENTS

Figure 1:
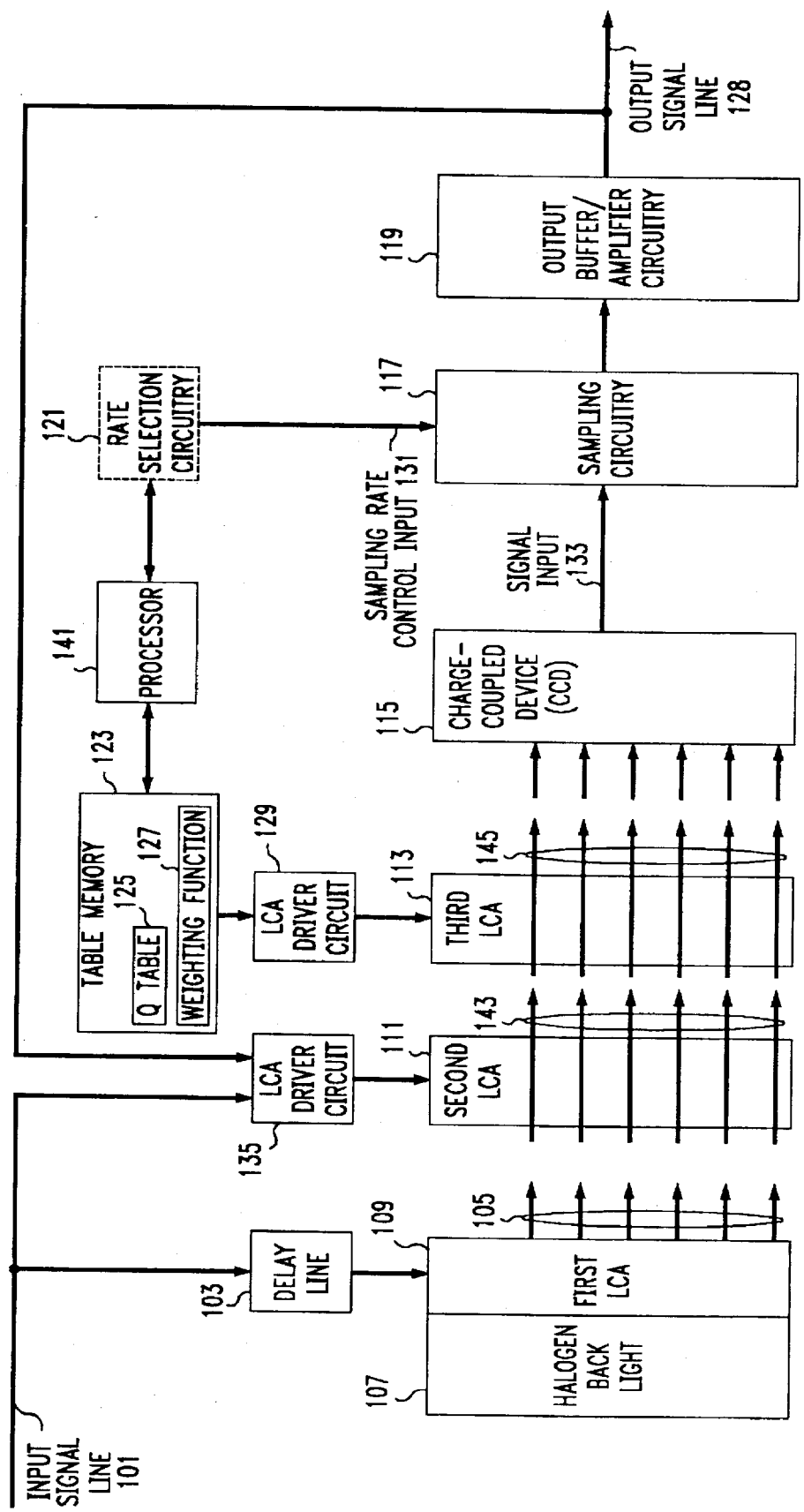
FIG. 1 is a hardware block diagram setting forth a first preferred embodiment of the optical signal processing system disclosed herein.

FIG. 1 is a hardware block diagram setting forth a first preferred embodiment of the optical signal processing system disclosed herein. The optical signal processing system of FIG. 1 processes signals in real time using a first light valve device (first LCA 109), a second light valve device (second LCA 111), a third light valve device (third LCA 113), a fixed-value light source (halogen back light 107), and a charge-coupled device (CCD) 115.

The first LCA 109 is positioned between the halogen back light 107 and the second LCA 111. The second LCA 111 is positioned between the first LCA 109 and the third LCA 113. The third LCA 113 is positioned between the second LCA 111 and the CCD 115. The positioning of first, second, and third LCAs 109, 111, 113 with respect to halogen back light 107 and CCD 115 is implemented so as to enable the LCAs to selectively control the amount of light from the halogen back light which is incident upon the CCD.

The first LCA 109 is driven by the output of a delay line 103, the second LCA 111 is driven by LCA driver circuit 135, and the third LCA is driven by LCA driver circuit 129. Conventional devices may be employed to implement LCA driver circuits 129 and 135. Delay line 103 is of conventional design and may consist, for example, of a conventional memory buffer device. Third LCA driver circuit 129 is coupled to a table memory 123 which stores a Q table 125 of quantization coefficients, as well as a weighting function 127. A processor 141 accesses, controls, and indexes table memory 123. Processor 141 may be a microprocessor of conventional design, and table memory 123 may consist of any desired combination of conventional random-access memory (RAM) and/or read-only memory (ROM).

CCD 115 provides an output signal on signal line 133 which is coupled to sampling circuitry 117. Sampling circuitry 117 is digital sampling circuitry of conventional design which periodically samples the output of CCD 115. This sampling circuitry 117 includes a sampling rate control input 131 for determining the sampling rate of sampling circuitry 117. Rate selection circuitry 121 for determining and selecting a desired sampling rate is coupled to sampling rate control input 131. This rate selection circuitry 121 is controlled by processor 141. Although rate selection circuitry 121 and processor 141 are shown as separate elements in FIG. 1, it is possible to combine these elements, using processor 141 to perform the functions of rate selection circuitry 121. In this manner, the functions of the rate selection circuitry 121 block may be absorbed into the processor 141 block. The output of sampling circuitry 117 is coupled to output buffer/amplifier circuitry 119, which includes conventional video buffers and amplifiers.

The output signal produced by output buffer/amplifier circuitry 119 is coupled to LCA driver circuit 135. Therefore, the output of LCA driver circuit 135 used to drive second LCA 111 is a function of the input signal on input signal line 101, as well as the output signal on output signal line 128. The output of LCA driver circuit 129 used to drive LCA 113 is a function of the weighting function 127 and the Q table 125 stored in table memory 123. The output of delay line 103 used to drive first LCA 109 is a function of the input on input signal line 101.

The system of FIG. 1 operates as follows. Halogen back light 107 illuminates first LCA 109. A delayed version of the input signal on input signal line 101 is applied to the first LCA 109, affecting the degree to which various portions of LCA 109 attenuate the illumination from halogen back light 107. The light rays originating at halogen back light 107 traverse first LCA 109 and are selectively attenuated, forming a first set of rays 105. The first set of rays 105, incident upon second LCA 111, represent an optical version of the original input signal on signal line 101.

The second LCA 111 is driven with a combination of the original input signal on signal line 101 and the output signal on output signal line 128. First set of rays 105 traverse the second LCA 111 and are selectively attenuated, forming a second set of rays 143. The second set of rays 143 are incident upon third LCA 113, which is driven by a signal representing a weighting function 127. The particular weighting function used to implement weighting function 127 is determined by the specific signal processing operation to be performed. The second set of rays 143 traverse the second LCA 113 and are selectively attenuated, forming third set of rays 145. Third set of rays 145 are incident upon CCD 115, which converts rays 145 into corresponding electronic signals. These electronic signals are coupled to sampling circuitry 117 over signal input 133.

Sampling circuitry 117 samples the signals on signal input 133 at a rate determined by rate selection circuitry 121. The sampled signals are coupled to output buffer/amplifier circuitry 119 which produces an output signal representing processed data on output signal line 128.

According to one preferred embodiment disclosed herein, the signals on input signal line 101 represent digitized video information. Although a halogen back light 107 is employed in the system of FIG. 1 for purposes of illustration, other stable light sources, such as a cold-cathode fluorescent lamp, may be used in place of the halogen back lamp. Although active-matrix liquid crystal arrays (LCAs) 109, 111, 113 are shown in the system of FIG. 1, other types of light valve devices may be employed as well. The system of FIG. 1 is equipped to perform signal processing operations such as real-time video compression and expansion. Such compression and expansion is performed irreversibly, but the temporal relationship of the original video signal is maintained.

Figure 2:
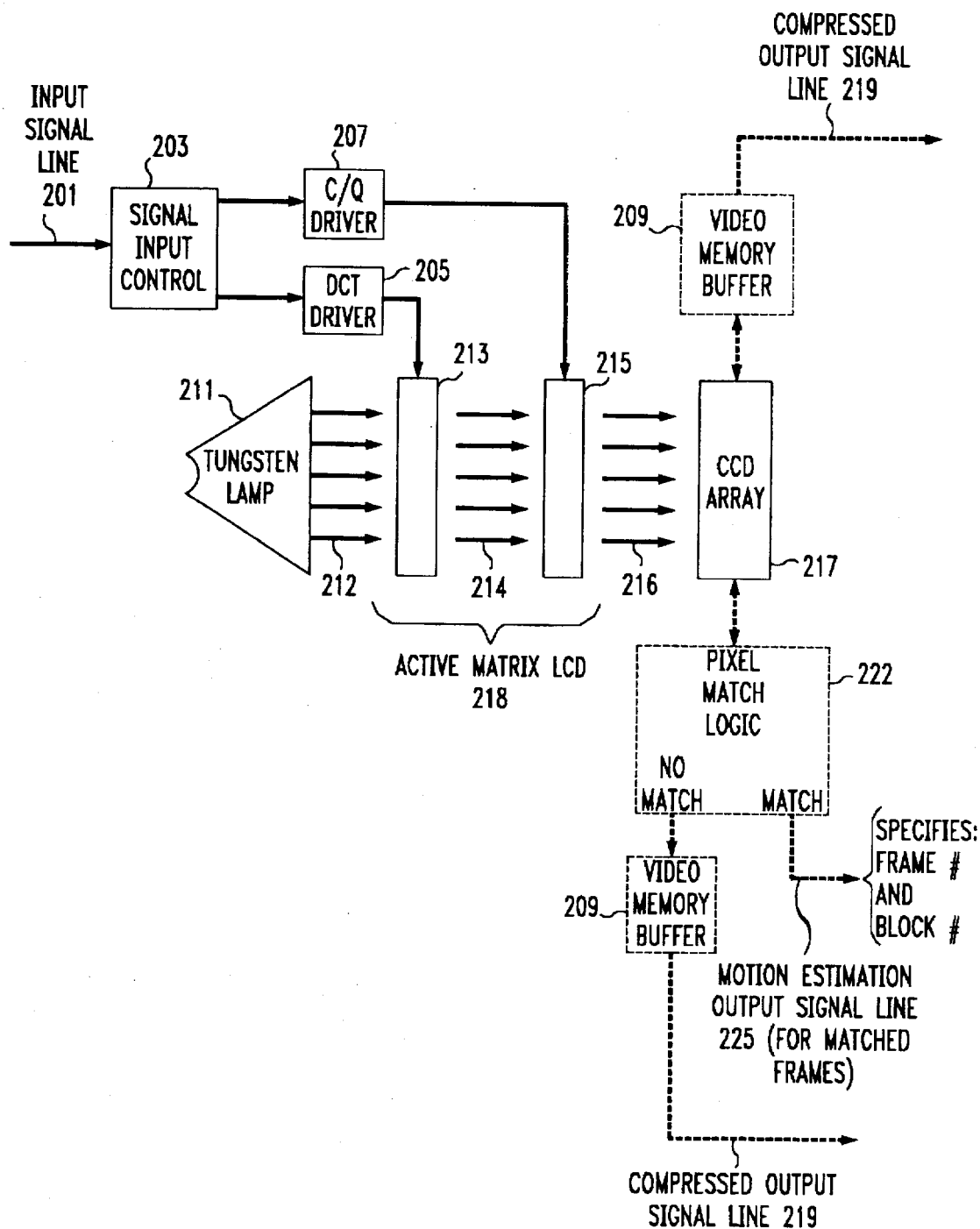
FIG. 2 is a hardware block diagram setting forth a second preferred embodiment of the optical signal processing system disclosed herein.

Refer now to FIG. 2, which sets forth a hardware block diagram of a second preferred embodiment of the optical signal processing system disclosed herein. An input signal representing a signal to be processed is coupled to signal input control 203 circuitry over input signal line 201. Signal input control 203 extracts DCT (discrete cosine transform) coefficients from the input signal and applies these DCT coefficients to a DCT driver circuit 205. The signal input control 203 circuitry also performs the function of coupling the input signal to a C/Q driver 207. C/Q driver 207 applies a weighting function to the input signal, as will be described in greater detail below.

A conventional tungsten lamp 211 provides illumination in the form of a first set of rays 212. The first set of rays 212 is incident upon a first liquid crystal array (LCA) 213 of an active-matrix, liquid crystal display (LCD) 218. The first LCA 213 is driven by DCT driver circuit 205. The DCT driver circuit 205 provides drive signals for the first LCA 213, such that the light traversing the first LCA (and shown as second set of rays 214) represents the original optical image of the input signal converted to a DCT normalized value. In the present example, the signals provided by DCT driver 205 circuit are selected to be in the range of 0 to 255 to implement any of several image compression schemes well-known to those skilled in the art (JPEG, etc.). In this manner, the first LCA 213 applies a digitally-determined attenuation function to first set of rays 212, wherein the attenuation function specifies gray scale levels of 0 (black) through 255 (white) for each pixel of the LCA 213.

The resultant light output of first LCA 213, in the form of second set of rays 214, is then applied to a second LCA 215 of the active-matrix LCD 218. The second LCA 215 applies one or more weight basis functions to the second set of rays 214. The weight basis functions are generated from the C/Q driver 207 circuit acting on the second LCA 215. In the context of the present example which describes the processing of an audiovisual signal, the second LCA 215 operates as a light valve having a light output that represents a C/Q gray scale value within the compressed range of 0 (black) through 16 (white) for each pixel cell. The higher-frequency components of the video signal have values approaching white, and the lower-frequency components have values approaching black. The resultant light output of second LCA 215, in the form of third set of rays 216, represents the compressed signal (video and audio). Third set of rays 216 are converted to electrical signals by a conventional charge-coupled device (CCD) array 217.

According to a first preferred embodiment of the system of FIG. 2, the output of CCD array 217 is processed by a video memory buffer 209, which may incorporate conventional video camera circuitry well-known to those skilled in the art. The output of video memory buffer 209, representing a processed version of the input signal on input signal line 201, is placed on compressed output signal line 219. In the present example, this signal processing includes compression. The system of FIG. 2 is equipped to perform real-time compression of video and audio signals in no more than 90 percent of the time required by presently-existing video processing methods. In addition, the systems of FIGS. 1 and 2 may be used to implement virtually any type of existing compression technique, and these systems are transparent to the specific type of compression technique that is employed, i.e., JPEG, MPEG, etc.

According to a second preferred embodiment of the system of FIG. 2, the output of CCD array 217 is processed by pixel match logic 222. Pixel match logic 222 may include conventional logic circuitry for comparing the values of pixels. Pixel match logic 222 is employed in operational environments where it is desired to perform motion estimation procedures. If pixel match logic 222 locates a pixel match, signifying, for example, that a pixel in a given position within a frame has not changed in value from a given frame to the immediately succeeding frame, then pixel match logic 222 produces an output signal which specifies the frame number and the block number of the matching pixel on motion estimation output signal line 225. If pixel match logic 222 finds no pixel match, then pixel match logic 222 passes the CCD array 217 output to video memory buffer 209. The output of video memory buffer 209 is a compressed output signal on compressed output signal line 219.

Figure 3:
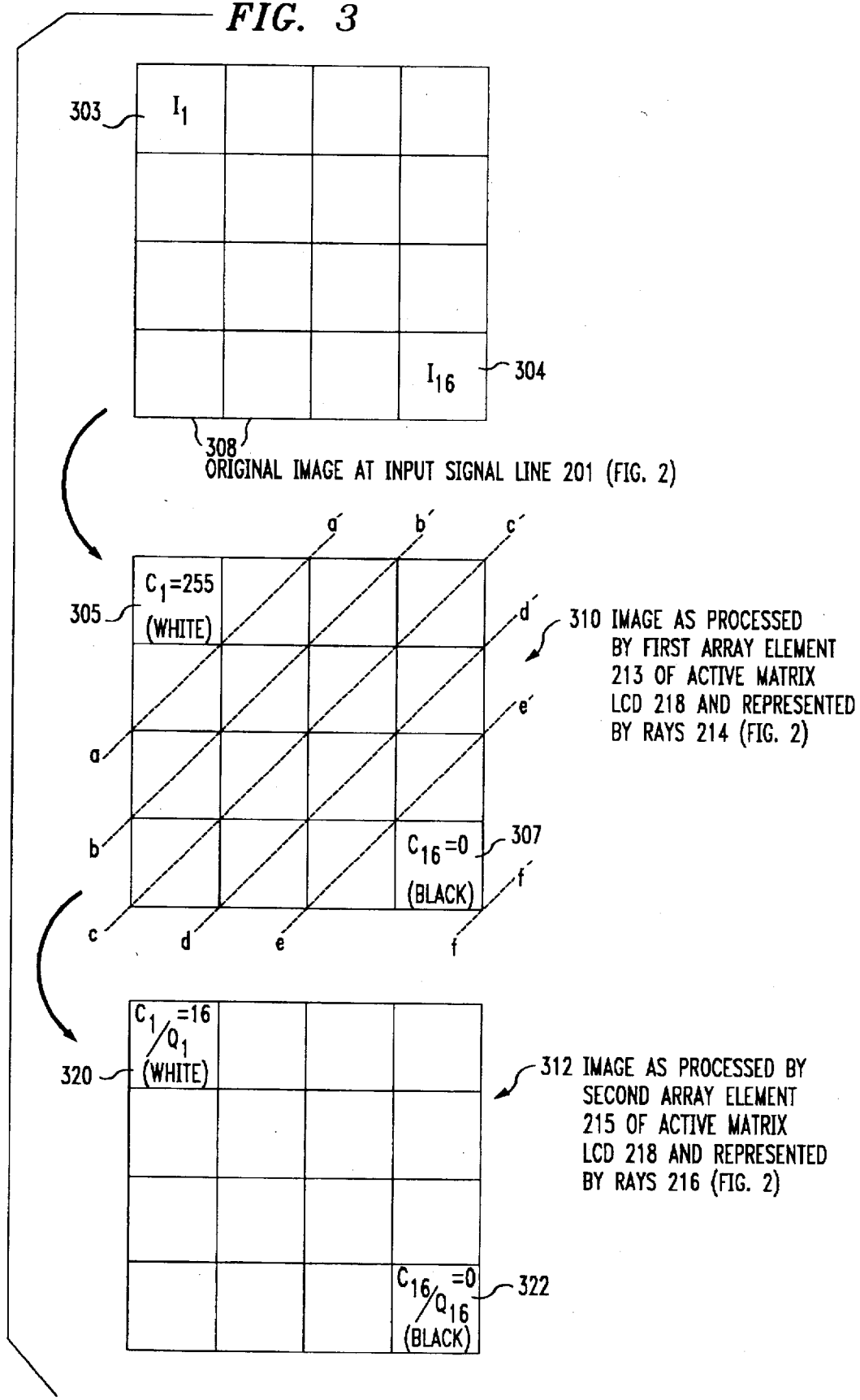
FIG. 3 is a graphical representation of an illustrative image to be processed by the optical signal processing system of FIG. 2.

Refer now to FIG. 3 which sets forth the contents of representative images at various signal processing steps in the system of FIG. 2. Image 308 represents the original image at input signal line 201 (FIG. 2). The image is organized into a 4×4 array of pixels, including pixel 303 having a value of $I_1$, and pixel 304 having a value of $I_{16}$. Pixels relatively close to pixel 304 represent relatively low-frequency components of the original image, and pixels relatively close to pixel 303 represent relatively high-frequency components of the original image.

Image 308 is processed by first LCA 213 (FIG. 2) to produce image 310 (FIG. 3) which is represented by second set of rays 214 (FIG. 2). Pixel 305 (FIG. 3) has a value $C_1$ of 255, and pixel 307 has a value $C_{16}$ of 0. Each pixel 305, 307 of image 310 is produced by a corresponding pixel of the first LCA 213 (FIG. 2) acting upon the incident illumination from the tungsten lamp 211 (FIG. 2). Each pixel of first LCA 213 (FIG. 2), and each corresponding pixel of image 310 (FIG. 3) represents a specific frequency component of the original image. The amplitude value of each pixel (i.e., 255 in the case of pixel 305, FIG. 3, and 0 in the case of pixel 307) represents the magnitude value of each frequency component. In the present example, these magnitude values are selected to be in the range of 0–255.

The frequency components of each pixel 305, 307 in image 310 (FIG. 3), as represented by corresponding pixels of first LCA 213 (FIG. 2) and second set of rays 214, are now divided by corresponding entries in a Q table. The Q table is stored in C/Q driver 207 (FIG. 2), which applies the Q table to image 310 (FIG. 3). The Q table may be hardwired into C/Q driver 207 (FIG. 2), or the Q table may be placed into random-access memory (RAM) or read-only memory (ROM) associated with C/Q driver 207. The C/Q driver 207 controls each pixel of second LCA 215 to selectively attenuate second set of rays 214. Since second set of rays 214 includes representations of each pixel 305, 307 of image 310 (FIG. 3), this selective attenuation is performed such that each pixel 305, 307 is divided by a corresponding entry of the Q table of C/Q driver 207 (FIG. 2). The resultant light output from second LCA 215, in the form of third set of rays 216, represents quantized DCT coefficients corresponding to the original image.

The third set of rays 216 (FIG. 2) includes a representation of image 312 (FIG. 3). Image 312 is applied to CCD array 217 (FIG. 2) which consists of an array of charge-coupled device cells. The video memory buffer 209 electronically scans the CCD array 217 in a conventional zigzag pattern. This pattern is shown in FIG. 3 as scanning lines a-a' b-b', c-c', d-d', e-e', and f-f'. The zigzag pattern is employed to organize the frequency components of the processed audio/video signal, such that the frequency components of the output signal are presented in ascending frequency order.

Figure 4:
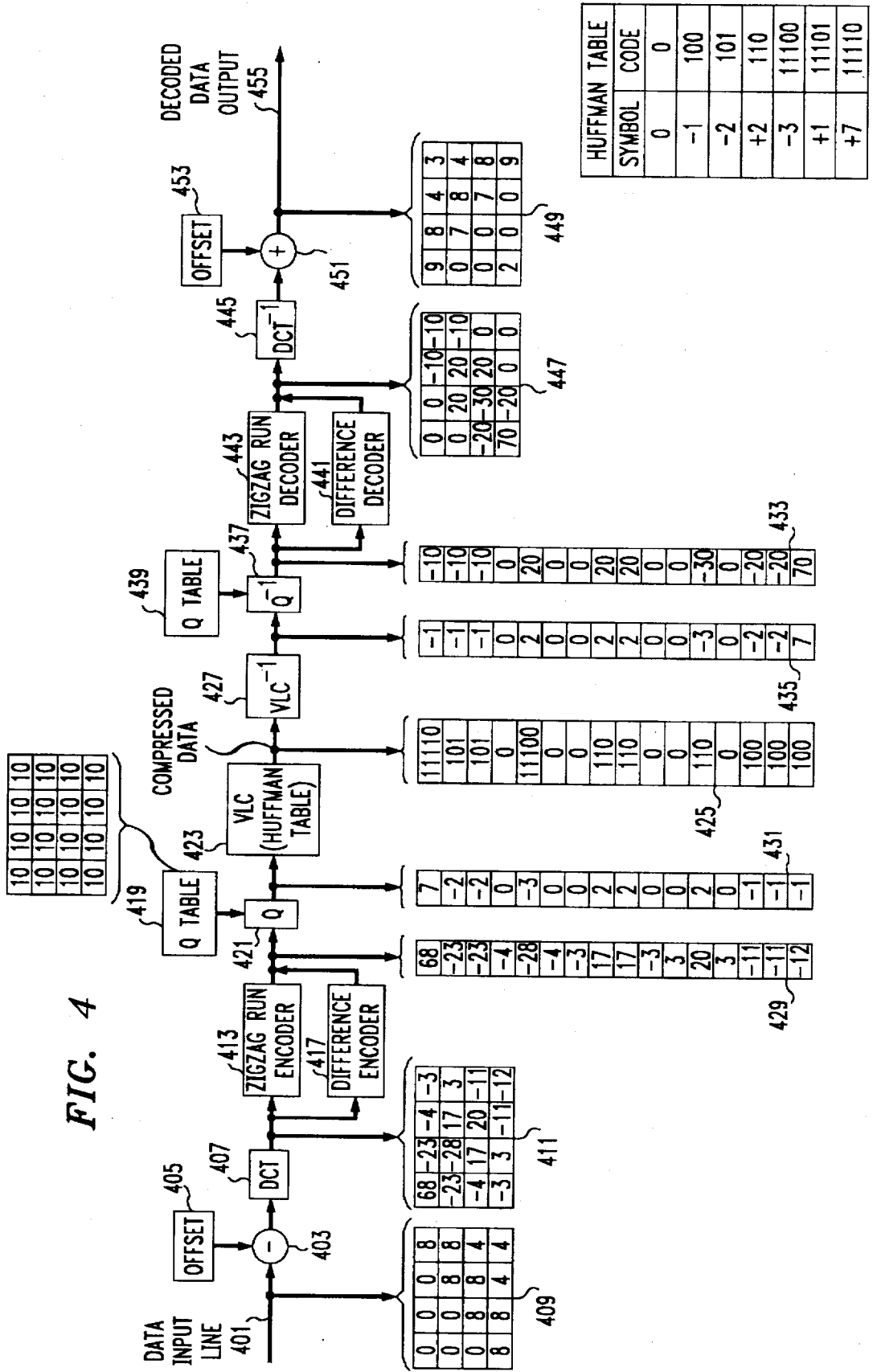
FIG. 4 is a combined hardware and data structure diagram setting forth a third preferred embodiment of the signal processing system disclosed herein for implementing JPEG video compression.

FIG. 4 is a combined hardware and data structure diagram setting forth a third preferred embodiment of the signal processing system disclosed herein for implementing JPEG video compression. An audio/video input signal to be JPEG-compressed is fed to data input line 401. The audio/visual input signal includes a digital representation of image 303 (FIG. 3). Various well-known methods exist for converting conventional analog audio/video signals into the format of image 303. Image 303 is in the form of a 4×4 pixel array, and an illustrative example of the contents of this array are set forth in FIG. 4 as first array 409. An offset 405 generator coupled to a subtractor 403 applies an offset function to first array 409. A DCT 407 function is then applied to the offset array, yielding second array 411. Note that this second array 411 is represented in FIG. 2 by second set of rays 214. DCT 407 (FIG. 4) may be implemented, for example, by DCT driver 205 and first LCA 213 (FIG. 2).

Returning now to FIG. 4, a zigzag run encoder 413 in parallel with a difference encoder 417 are applied to the second array 411, followed by a Q 421 function. The parallel combination of zigzag run encoder 413 and difference encoder 417, followed by Q 421 function, may be implemented by the C/Q driver 207 and the second LCA 215 (FIG. 2). After the second array 411 has been processed by the parallel combination of zigzag run encoder 413 and difference encoder 417, but prior to the application of the Q 421 function, the second array 411 is transformed into third array 429. After application of Q function 421, the third array 429 is transformed into a fourth array 431. The Q function 421 is implemented using a Q table 419 which, in the present example, is a 4×4 array wherein each element of the array has a value of 10. Therefore, the Q function 421 effectively performs a division operation (divide by ten) on the third array 429, rounding off the result to the nearest integer.

The data contained in fourth array 431 are compressed using a VLC (variable length coder) 423, which applies a Huffman table function to the fourth array 431. Note that the array entries of the first, second, third and fourth arrays 409, 411, 429, 431, respectively, are in conventional decimal (base ten) notation. The Huffman table associates each of a plurality of decimal (base ten) integers with corresponding binary codes. An illustrative example of a Huffman table is shown in FIG. 4, where the first column heading entitled "symbols" refers to decimal (base ten) integers, and the second column headed "code" refers to the binary code that is assigned to each symbol. For example, the table specifies that the symbol +2 corresponds to a binary code of 110. VLC 427 replaces each symbol (i.e., each entry) in the fourth array 431 with the corresponding code from the Huffman table, thereby generating fifth array 425.

An inverse VLC 427 transform is applied to the fifth array 425 to generate sixth array 435, and an inverse Q 437 transform is applied to the sixth array 435 to generate a seventh array 433. The inverse Q 437 transform is determined by the contents of Q table 439. The output of inverse Q 437 transform is processed by the parallel combination of a zigzag run decoder 443 and a difference decoder 441 to generate eighth array 447. Note that third, fourth, fifth, sixth, and seventh arrays 429, 431, 425, 435, 433, respectively, are one-dimensional arrays, whereas eighth array 447 is a 4×4 array having the same dimensions as first and second arrays 409, 411. Eighth array 447 is subjected to an inverse DCT 445 transform, and a fixed offset is added to the array by an offset 453 generator and a summer 451, to generate ninth array 449. The ninth array 449 represents decoded data output 455 compressed in the JPEG format. The data compression performed by the system of FIG. 4 is a "lossy" compression in the sense that the compression is irreversible.

The invention claimed is:

1. A signal processing system for processing signals in real time, the system comprising a first light valve device, a second light valve device, a third light valve device, a substantially fixed-output light source, and a charge-coupled device, wherein the first light valve device is positioned between the light source and the second light valve device, the second light valve device is positioned between the first light valve device and the third light valve device, and the third light valve device is positioned between the second light valve device and the charged-coupled device, so as to enable the first, second, and third light valve devices to selectively control the amount of light from the light source which is incident upon the charge-coupled device;

the signal processing system further comprising a delay line, a first driver circuit for driving a light valve device, and a second driver circuit for driving a light valve device, wherein the first light valve device is driven by the output of the delay line, the second light valve device is driven by the first driver circuit, and the third light valve device is driven by the second driver circuit.

2. The signal processing system of claim 1 wherein the delay line is a memory buffer device.

3. The signal processing system of claim 1 further comprising a table memory, wherein the second driver circuit is coupled to the table memory, the table memory storing a Q table of quantization coefficients and a weighting function.

4. The signal processing system of claim 3 further comprising a processor for accessing, controlling, and indexing the table memory.

5. The signal processing system of claim 4 wherein the processor is implemented using a microprocessor device.

6. The signal processing system of claim 3 wherein the table memory includes any combination of random-access memory (RAM) and/or read-only memory (ROM).

7. The signal processing system of claim 1 further comprising sampling circuitry, wherein the charge-coupled device provides an output signal that is coupled to the sampling circuitry.

8. The signal processing system of claim 7 wherein the sampling circuitry is digital sampling circuitry which periodically samples the output of the charge-coupled device.

9. The signal processing system of claim 8 wherein the sampling circuitry includes a sampling rate control input for determining the sampling rate of the sampling circuitry.

10. The signal processing system of claim 9 further including rate selection circuitry coupled to the sampling rate control input, wherein the rate selection circuitry determines and selects a desired sampling rate.

11. The signal processing system of claim 10 wherein the rate selection circuitry is controlled by the processor.

12. The signal processing system of claim 11 wherein the rate selection circuitry and the processor are combined, such that the processor performs the functions of the rate selection circuitry.

13. The signal processing system of claim 7 further comprising buffer/amplifier circuitry for producing an output signal, wherein the output of the sampling circuitry is coupled to the output buffer/amplifier circuitry, the output buffer/amplifier circuitry including video buffers and amplifiers.

14. The signal processing system of claim 13 wherein the output signal produced by output buffer/amplifier circuitry is coupled to the first driver circuit, such that the output of the first driver circuit drives the second light valve device, the output of the first driver circuit being a function of (a) an input signal to be processed, and (b) the output signal.

15. The signal processing system of claim 13 wherein the output of the second driver circuit used to drive the third light valve device is a function of the weighting function and the Q table stored in table memory.

16. The signal processing system of claim 15 wherein the output of the delay line used to drive the first light valve device is a function of an input signal to be processed.

17. The signal processing system of claim 1 wherein the signal processing operations are performed in real time, and the temporal relationship of the input signal to be processed is maintained.

18. In a signal processing system for processing signals in real time, the system comprising a first light valve device, a second light valve device, a third light valve device, a substantially fixed-output light source, and a charge-coupled device, wherein the first light valve device is positioned between the light source and the second light valve device, the second light valve device is positioned between the first light valve device and the third fight valve device, and the third light valve device is positioned between the second light valve device and the charged-coupled device, so as to enable the first, second, and third light valve devices to selectively control the amount of light from the light source which is incident upon the charge-coupled device, the system further comprising a delay line, a first driver circuit for driving a light valve device, and a second driver circuit for driving a light valve device, wherein the first light valve device is driven by the output of the delay line, the second light valve device is driven by the first driver circuit, and the third light valve device is driven by the second driver circuit, A METHOD FOR PROCESSING SIGNALS comprising the following steps:

(a) illuminating the first light valve device with the light source;

(b) applying a delayed version of an input signal to be processed to the first light valve device, thereby affecting the degree to which various portions of the first light valve device attenuate the illumination from the light source;

wherein the light rays that originate at the light source, traverse the first light valve device and are selectively attenuated by the first light valve device, form a first set of rays, the first set of rays 105 representing an optical version of the input signal to be processed;

(c) illuminating the second light valve device with the first set of rays;

(d) applying a first drive signal to the second light valve device, the first drive signal including a combination of (a) the input signal to be processed, and (b) an output signal representing a processed version of the input signal, such that the first set of rays traverse the second light valve device and are selectively attenuated, forming a second set of rays;

(e) illuminating the third light valve device with the second set of rays;

(f) applying a second drive signal to the third light valve device, the second drive signal representing a weighting function for implementing a specified signal processing operation, wherein the second set of rays traverse the third light valve device and are selectively attenuated, forming third set of rays;

(g) illuminating the charge-coupled device with the third set of rays 145, such that the charge-coupled device converts the third set of rays into corresponding electronic signals representing a processed version of the input signal to be processed.

19. The method of claim 18 wherein the signal processing system further comprises a sampling circuit, a sampling rate selection circuit coupled to the sampling circuit, and an output buffer/amplifier coupled to the sampling circuit, the method further comprising the steps of:

(a) coupling the electronic signals produced by the charge-coupled device to the sampling circuit, wherein the sampling circuit samples the input signal to be processed at a sampling rate determined by the rate selection circuitry.

20. The method of claim 19 further comprising the step of coupling the sampled signals to the output buffer/amplifier, the output buffer/amplifier producing an output signal representing a processed version of the input signal to be processed.

21. The method of claim 20 wherein the input signal to be processed represents digitized video information.

* * * * *